US011539961B1

United States Patent
Hallmarker et al.

(10) Patent No.: US 11,539,961 B1
(45) Date of Patent: Dec. 27, 2022

(54) SMOOTHING BIT RATE VARIATIONS IN THE DISTRIBUTION OF MEDIA CONTENT

(71) Applicant: Amazon Technologies, Inc., Seattle, WA (US)

(72) Inventors: Ola Hallmarker, Segeltorp (SE); Dag Henriksson, Spanga (SE); Yongjun Wu, Bellevue, WA (US); Hai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/456,449

(22) Filed: Nov. 24, 2021

(51) Int. Cl.
*H04N 19/146* (2014.01)
*H04N 19/156* (2014.01)
*H04N 19/177* (2014.01)
*H04N 19/152* (2014.01)
*H04N 21/234* (2011.01)
*H04N 21/236* (2011.01)
*H04N 21/262* (2011.01)

(52) U.S. Cl.
CPC ......... *H04N 19/146* (2014.11); *H04N 19/152* (2014.11); *H04N 19/156* (2014.11); *H04N 19/177* (2014.11); *H04N 21/23406* (2013.01); *H04N 21/23611* (2013.01); *H04N 21/262* (2013.01)

(58) Field of Classification Search
CPC .. H04N 19/146; H04N 19/152; H04N 19/156; H04N 19/177; H04N 21/23406; H04N 21/23611; H04N 21/262
See application file for complete search history.

(56) References Cited

U.S. PATENT DOCUMENTS

| 2005/0069039 A1* | 3/2005 | Crinon | H04N 19/51 375/E7.199 |
| 2005/0074061 A1* | 4/2005 | Ribas-Corbera | H04N 19/51 375/E7.199 |
| 2006/0104356 A1* | 5/2006 | Crinon | H04N 19/164 375/E7.199 |
| 2011/0299589 A1* | 12/2011 | Zhou | H04N 19/152 375/E7.126 |

FOREIGN PATENT DOCUMENTS

WO WO-2016018042 A1 * 2/2016 ............. H04L 67/02

* cited by examiner

*Primary Examiner* — Nicholas T Corbo
(74) *Attorney, Agent, or Firm* — Weaver Austin Villeneuve & Sampson LLP

(57) ABSTRACT

Methods and apparatus are described for delivering streams of media content in ways that smooth out the peaks that might otherwise occur due to the bit rate variations that result from encoding of the media content. This is accomplished by controlling the timing of the transmission of packets of the encoded media content.

20 Claims, 3 Drawing Sheets

SMOOTHING BIT RATE VARIATIONS IN THE DISTRIBUTION OF MEDIA CONTENT

BACKGROUND

There is an inherent trade-off between low latency and high quality when it comes to video compression. This trade-off manifests in the way that encoded video frames vary in bit rate over time which can present challenges in delivering video content to end users. For example, overall network throughput is unpredictable. At times there will be peaks or spikes in the bit rate. Content service provides must ensure sufficient streaming server capacity to handle the worst case for such peaks. Home network equipment can also experience capacity problems with bit rate peaks, resulting in a poor user experience.

For example, assume that a particular video stream is encoded at an average of 10 Mbps and a content provider provisions a streaming server with 10 Gbps network capacity to deliver the video stream. Theoretically, the streaming server is capable of serving 1000 concurrent streams. However, if the bit rate of the encoded video has peaks up to 20% above the average (a typical scenario), the theoretical peak bit rate for the 1000 streams will be 1000*10*1.2=12 Gbps, i.e., 2 Gbps more than the network capacity of the streaming server. This peak bit rate becomes the practical reality where the 1000 streams are all for the same live event.

This issue could be handled by only allowing the streaming server to serve the number of concurrent streams that fit within the server's network capacity at the peak (i.e., 833 streams). However, this means that much of the available network capacity of the server will go unused during the vast majority of the duration of the streaming sessions.

DETAILED DESCRIPTION

This disclosure describes techniques for delivering streams of media content in ways that smooth out the peaks that might otherwise occur due to the bit rate variations that result from encoding of the media content. This is accomplished by controlling the timing of the transmission of packets of the encoded media content. According to a particular class of implementations, the timing of packet transmission is controlled such that the transmission bit rate is smoothed relative to the encoding bit rate. An example will be instructive.

Figure 1:
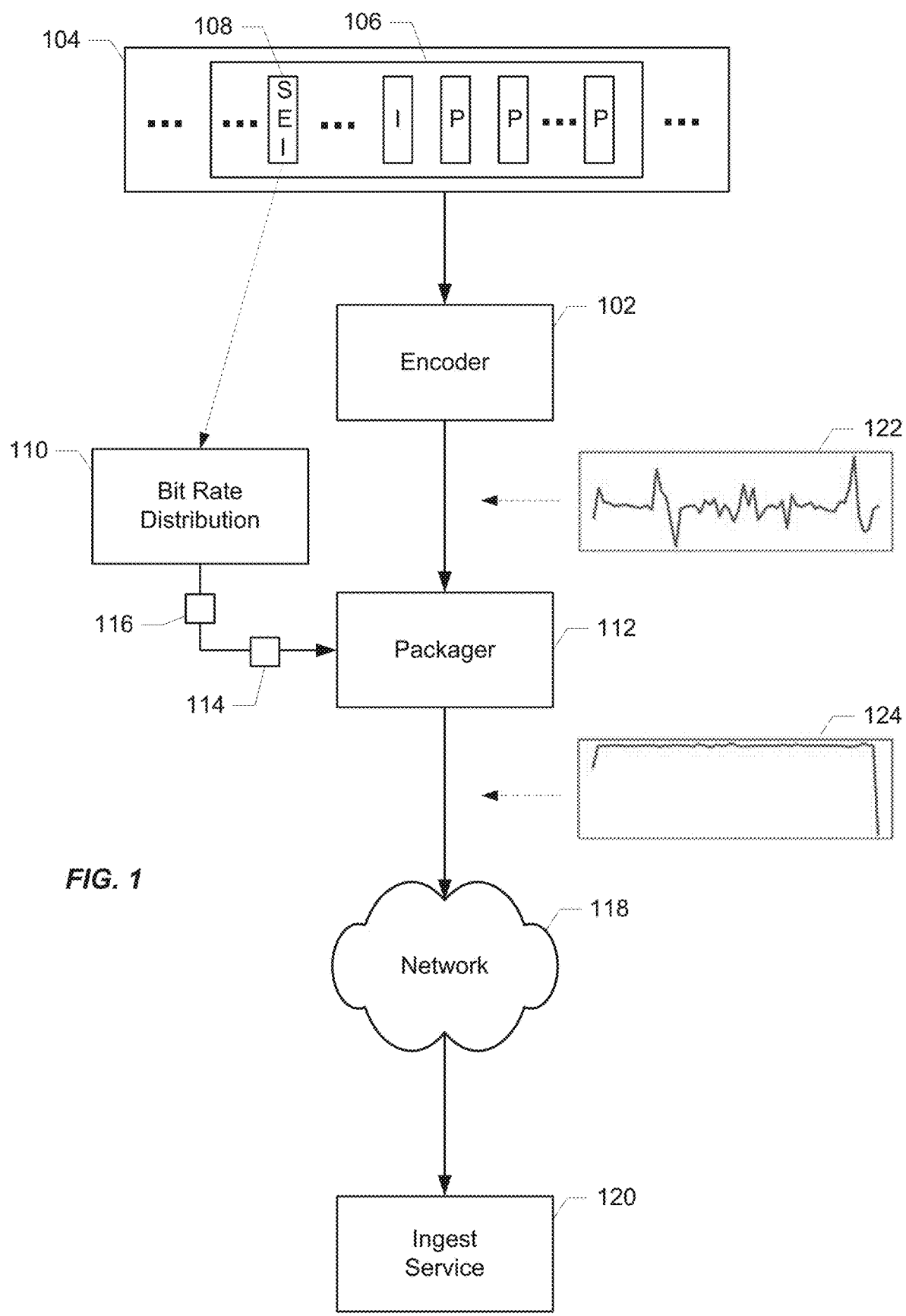
FIG. 1 is a simplified diagram illustrating operation of an example of a system for distributing media content as enabled by the present disclosure.

FIG. 1 shows a simplified diagram of an example of a system in which media content is encoded, packaged, and transmitted to a media server for distribution according to a specific implementation enabled by the present disclosure. An encoder 102 receives source video content 104 that includes a sequence of video frames or group of pictures (GOP) 106. GOP 106 is shown as including I and P frames and a Supplemental Enhancement Information (SEI) unit 108. In this example, encoder 104 is configured as a constant-bit-rate (CBR) encoder with a specified nominal bit rate. Encoder 104 employs what is known as a "leaky bucket" model when encoding the frames of GOP 106.

The leaky bucket model is embodied by information associated with each GOP that represents the current fullness of the "bucket," the size of which is specified when the encoder is configured. Conventionally, this information serves two purposes. The encoder uses the bucket fullness information as a rate controller to determine how many bits to employ in encoding the frames of the GOP while still remaining within the constraints defined by the model, i.e., the bucket should neither overflow nor underflow.

On the playback device, the decoder uses the bucket fullness information to determine when to send a frame from its buffer to the renderer. Again, the decoder does not want to remove frames too quickly (and starve the buffer) or too slowly (and overflow the buffer).

For implementations employing the Advanced Video Coding (AVC or H.264) codec and the High-Efficiency Video Coding (HEVC or H.265) codec, bucket fullness information is communicated in a Supplemental Enhancement Information (SEI) Network Abstraction Layer (NAL) unit known as the SEI Buffering Period NAL unit which is associated with each GOP. The information in the SEI Buffering Period NAL unit (which actually represents the buffer fullness of a hypothetical receiver) represents how many bits are in the bucket at the current stage of encoding.

According to various implementations enabled by the present disclosure, the bucket fullness information associated with each GOP is used to control the timing of the transmission of the packets of the encoded content. Each video frame may be on the order of 1 Mb in size which may divided into something on the order of 500 packets. Each GOP might encompass two seconds of video content and so might include 60 or 120 frames depending on the number of frames per second.

Referring again to FIG. 1, the bucket fullness information is read (e.g., from SEI NAL unit 108) by Bit Rate Distribution logic 110 associated with encoder 102 and packager 112. In the depicted implementation, Bit Rate Distribution Logic 110 uses the bucket fullness information to determine two things; a delay 114 to be imposed before transmitting the first packet of the GOP, and a time duration 116 between the transmission of successive packets of the GOP. In the depicted example, the timing of the transmission of the packets of the GOP results in a smoothed transmission bit rate (e.g., in a range near the nominal bit rate of CBR encoder 102) at which the encoded media presentation is transmitted over network 118 from packager 112 to ingest service 120.

The effect of the timing of packet transmission may be understood with reference to graphs 122 and 124. Graph 122 represents variations in the encoding bit rate (and therefore also the packet transmission rate if the packets were transmitted without any delay). By contrast, graph 124 represents application of the timing information in a way that smooths out the bit rate variations introduced by the encoder. According to a particular class of implementations, the transmission bit rate converges to a range around a target bit rate (e.g., the nominal bit rate of the encoder). The range of variation (expected to be less than about 10%) results from factors such as, for example, differences in encoded frame size or various latencies representing variations in available network capacity. Implementations are contemplated in which the transmission bit rate is substantially constant at the target bit rate with a range of variation less than about 1%.

As will be discussed, the values of these timing parameters depend on the size of the bucket, e.g., the larger the bucket, the larger the bit rate variation allowed, resulting in the need for greater delay of the packets to converge to the desired bit rate.

As will also be discussed, the packet transmission timing information may be employed at multiple points in the distribution of the media content. For example, it may be employed to determine when to send packets from the encoder to an ingest service. It may also be employed to determine when to send packets from an egress server to an end user or a content delivery network (CDN).

Figure 2:
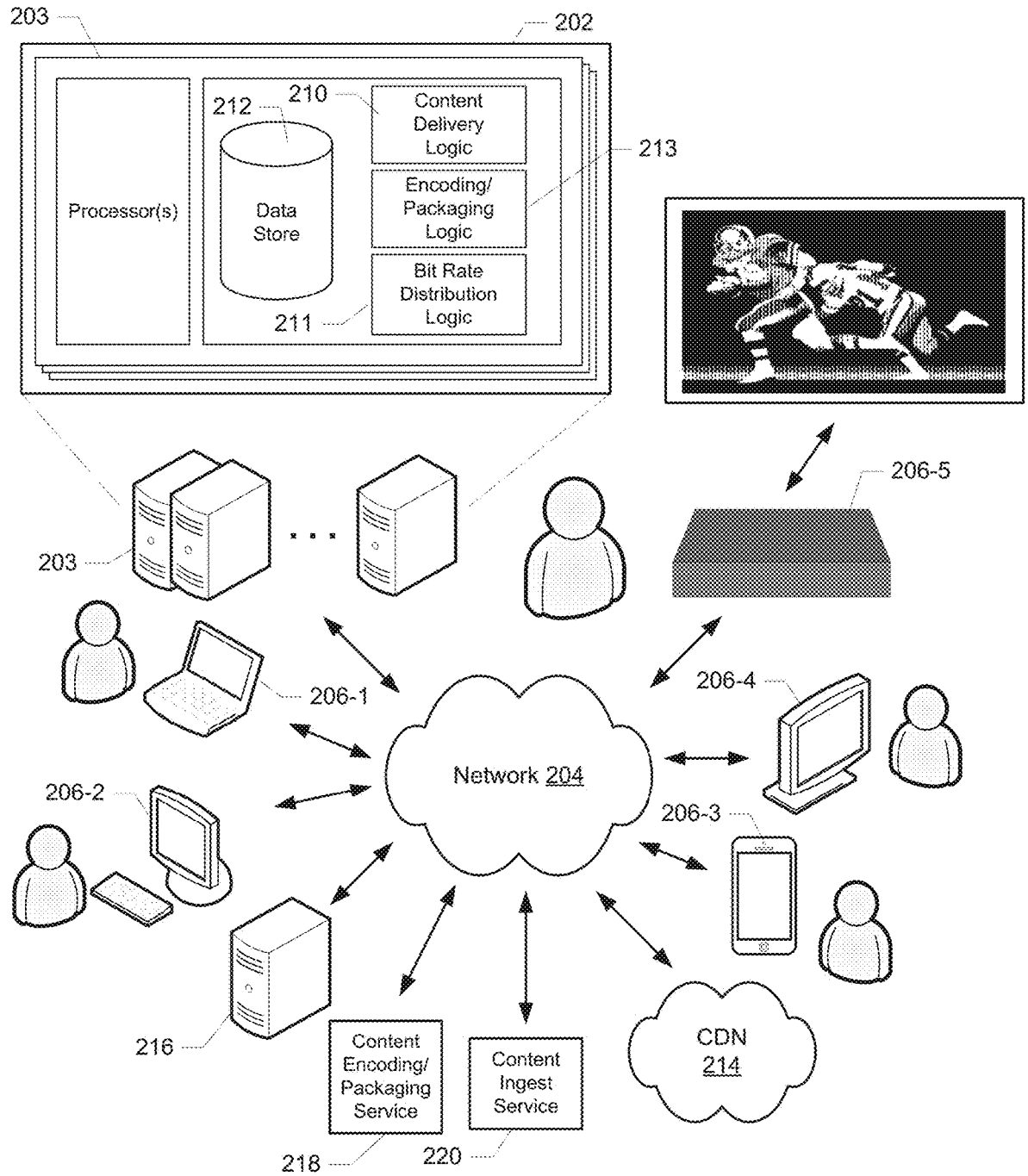
FIG. 2 is a simplified diagram of an example of a computing environment in which implementations enabled by the present disclosure may be practiced.

FIG. 2 illustrates an example of a computing environment in which a video content service 202 provides streaming content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP or UDP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that encodes, packages, and provides the content to client devices. However, it will be understood that content service 202 may provide access to content in conjunction with one or more content delivery networks (e.g., CDN 214) that may or may not be independent of content service 202. In addition, the source(s) of the content (and/or the resources used to encode and package the content) may or may not be independent of content service 202 (e.g., as represented by content provider server 216 and content encoding/packaging service 218). The range of variations known to those of skill in the art are contemplated to be within the scope of this disclosure.

It should also be noted that implementations are contemplated in which, in addition to content delivery logic 210 (which facilitates various aspects of content delivery to client devices 206), content service 202 may include other types of logic. For example, bit rate distribution logic 211 may be configured to determine and enforce transmission timing information for packets of content encoded and packaged by logic 213, which may employ any of a variety of video encoding standards such as, for example, AVC (H.264), HEVC (H.265), AV1, VP8, VP9, etc., as well as any of a variety of file formats including, for example, MP4, CMAF, etc.

In addition to providing access to video content, content service 202 may also include a variety of information related to the video content (e.g., other associated metadata and manifests in data store 212 to which service 202 provides access). Alternatively, such information about the content, as well as the content itself may be provided and/or hosted by one or more separate platforms, e.g., CDN 214, service 218. It should be noted that, while logic 210, 211, and 213, and data store 212 are shown as integrated with content service 202, implementations are contemplated in which some or all of these operate remotely from the associated content service, and/or are under the control of an independent entity.

For example, logic 211 and 213 may be implemented by encoding/packaging service 218. In another example, logic configured to use transmission timing information generated as described herein to achieve transmission bit rate smoothing may be implemented at different platforms at various points in the content delivery pipeline between content service 202 and client devices 206 such as, for example, ingest service 220, or CDN 214. From these examples, those of skill in the art will understand the diversity of use cases to which the techniques described herein are applicable.

Figure 3:
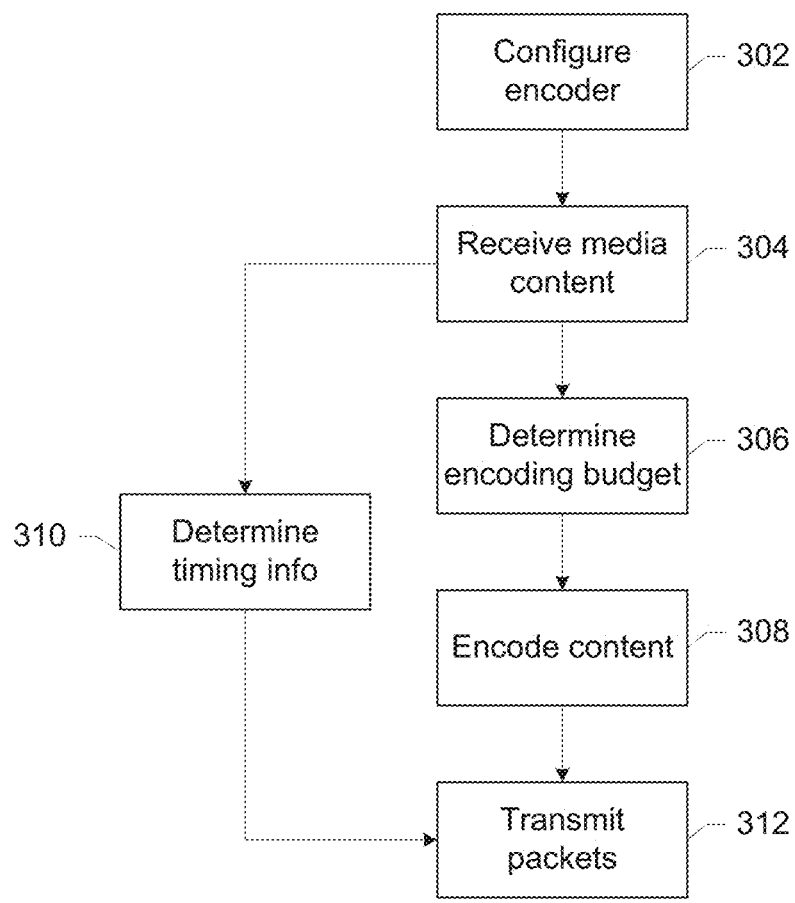
FIG. 3 is a flowchart illustrating operation of an implementation enabled by the present disclosure.

FIG. 3 is a flowchart illustrating operation of a particular class of implementations enabled by the present disclosure. The depicted implementation assumes encoding of the media content using AVC (H.264) or HEVC (H.265) and delivery of the encoded content using the user datagram protocol (UDP) of the Internet protocol (IP). As will be appreciated, the use of UDP may be advantageous for the delivery of media content depicting live events given its low latency when compared to the transport control protocol (TCP). An example of a platform that delivers media content using UDP/IP and which may be enhanced using the techniques described herein is the Sye streaming protocol originally developed by Net Insight and acquired by Amazon. It should be noted that, despite the foregoing, implementations are contemplated in which other codecs (e.g., AV1, VP9) and transport protocols may be employed.

An encoder is configured to employ a leaky bucket model for the encoding of media content (302). This configuration includes setting the size of the bucket (also known as the leaky bucket capacity), and the specified bit rate of the encoder. For AVC or HEVC encoders, the leaky bucket capacity is available as metadata associated with the media content and is referred to as the CBP_Size or Codec Buffer Picture size. The nature of the specified bit rate depends on the type of encoder being employed. For a CBR encoder, the specified bit rate is the nominal bit rate, a specified average bit rate to which the encoded bit stream converges. For a variable bit rate (VBR) encoder, which does not adhere to the concept of a configured average, the bit rate limit or maximum bit rate may be used.

The encoder receives a portion of the media content known as a group of pictures (GOP) (304). The GOP is a sequence of video frames that typically represents a two-second duration of the media content. Included with the GOP is leaky-bucket fullness information that the encoder uses to determine how many bits may be employed to encode the frames of the GOP. As discussed above, this information informs the encoder about the fullness of the leaky bucket (relative to the configured bucket size) based on the encoding of the media content so far, with positive contributions to the bucket being made when bits are consumed during the encoding of a frame, and negative contributions being made when a frame is transmitted.

According to implementations in which the encoder employs the AVC or HEVC codec, the bucket fullness information is provided in a supplemental enhancement information (SEI) network access layer (NAL) unit associated with the GOP referred to as the SEI Buffering Period NAL unit. The SEI Buffering Period NAL unit includes two values which, when one is divided by the other, represents a theoretical receiver's buffer fullness in seconds. As will be discussed, the value employed to determine the timing information for the transmission of the packets of the GOP is the sender's buffer fullness which may be derived from this information.

Based on the bucket fullness information, the encoder determines an encoding budget for the frames of the GOP (306), and encodes the frames based on that budget (308). Bit Rate Distribution logic associated with the encoder also employs the bucket fullness information to determine transmission timing information for the packets of the encoded content representing the frames of the GOP (310).

According to a particular class of implementations, the transmission timing information includes a transmission delay value for the initial packet of the GOP, as well as a duration value that represents the time between transmission of successive packets of the GOP. According to a particular implementation, the delay for the first packet of the GOP is a duration represented by the bucket fullness information. If the bucket is empty, the first packet is transmitted immediately. If the bucket is full, the first packet is delayed by the size of the bucket.

As mentioned above, AVC and HEVC implementations employ the sender's buffer fullness (SBF) (e.g., expressed in the unit of seconds) rather than the bucket fullness as represented by the values expressed in the SEI Buffering Period NAL unit. SBF is calculated by taking the difference of the leaky bucket capacity and the receiver buffer fullness (RBF):

$$SBF = CBP\_Size - RBF \text{ seconds} \quad (1)$$

According to various implementations, SBF represents the amount of time the first packet in the GOP should be delayed before being transmitted. The remainder of the packets in the GOP are then transmitted with the same duration, d, between them. The value for d is derived by dividing the packet size by the specified bitrate of the encoder (e.g., the nominal bit rate or the maximum bit rate depending on the encoder type). This is given by:

$$d = packetSize/(bit\ rate/8) \text{ seconds} \quad (2)$$

The packets of the GOP are then transmitted using this timing information (312). According to a specific implementation, each packet is assigned an offset based on the initial delay and the duration between packets. Application of this timing information to each packet in the stream of media content, results in the overall transmission bit rate converging to a range around a target bit rate (e.g., the nominal bitrate of a CBR encoder).

As mentioned above, this timing information may be employed at various points in the distribution of the media content. For example, the timing information may be employed to control the timing of packet transmission between the packager associated with the encoder and an ingest service responsible for distributing the content (e.g., to CDNs). In addition, or alternatively, the timing information may be employed to control the timing of packet transmission from an egress server (e.g., an edge server of a CDN) to an end user device. More generally, the timing information may be employed at any node between the packager and an end user device to smooth the corresponding transmission bit rate. However, each such use introduces latency which may be undesirable.

In cases in which the timing information is employed at an egress server, an additional fixed offset may be employed to ensure that jitter is not introduced by the core network during delivery of the media content to end user devices. The additional fixed offset will vary for different deployments and may be determined with reference to how much retransmission is expected from the ingress service to the egress servers. According to a specific implementation, a value of 0.8 seconds provides some margin for retransmissions in the core network. The use of the timing information at the egress server ensures that the server delivers the content to many end user devices at a transmission bit rate that is significantly smoother than the encoding bit rate, thereby ensuring that the capacity of the server is not exceeded by the number of streams it is serving.

While the subject matter of this application has been particularly shown and described with reference to specific implementations thereof, it will be understood by those skilled in the art that changes in the form and details of the disclosed implementations may be made without departing from the spirit or scope of the invention. For example, implementations have been described in which information representing bucket fullness and relating to a leaky-bucket model employed by an encoder is used to determine the transmission timing of packets of content. It should be noted, however, that implementations are contemplated in which information relating to an encoder's rate controller may be employed as described herein to control the transmission timing of the content packets. That is, any information used to determine an encoding bit rate may also be employed to determine timing information for the transmission of packets as described herein to achieve a transmission bit rate that is smoothed relative to the encoding bit rate.

Examples of some implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving media content including a sequence of video frames of a group of pictures (GOP);

receiving leaky-bucket fullness information for the GOP in a supplemental enhancement information (SEI) network access layer (NAL) unit associated with the GOP, the leaky-bucket fullness information corresponding to a leaky-bucket model;

based on the leaky-bucket fullness information, determining an encoding budget for a first video frame of the sequence of video frames;

encoding the first video frame based on the encoding budget;

based on the leaky-bucket fullness information, determining transmission timing information for packets of encoded content representing the first video frame, wherein the transmission timing information includes a transmission delay value for an initial packet of the packets of encoded content, and a duration value representing a time between transmission of successive packets of the packets of encoded content; and transmitting the packets of encoded content using a user datagram protocol (UDP) and the transmission timing information such that a substantially constant transmission bit rate is achieved.

2. The method of claim 1, wherein the substantially constant transmission bit rate corresponds to a nominal bit rate of a constant-bit-rate (CBR) encoder that generated the encoded content.

3. A computer-implemented method, comprising:
receive media content including a sequence of video frames;

receiving leaky-bucket fullness information for the sequence of video frames, the leaky-bucket fullness information corresponding to a leaky-bucket model;

based on the leaky-bucket fullness information, determining transmission timing information for packets of encoded content representing the sequence of video frames; and transmitting the packets of encoded content using the transmission timing information such that a transmission bit rate is achieved that is smoothed relative to an encoding bit rate associated with the encoded content.

4. The method of claim 3, wherein the transmission timing information includes a transmission delay value for an initial packet of the packets of encoded content.

5. The method of claim 4, wherein the transmission delay corresponds to a sender buffer fullness value derived from the leaky-bucket fullness information.

6. The method of claim 5, wherein the leaky-bucket fullness information includes a receiver buffer fullness value, and wherein determining the transmission timing information includes determining the sender buffer fullness value using the receiver buffer fullness value and a leaky-bucket capacity associated with the leaky-bucket model.

7. The method of claim 3, wherein the transmission timing information includes a duration value representing a time between transmission of successive packets of the packets of encoded content.

8. The method of claim 7, wherein the duration value is determined using a packet size for the packets of encoded content and a nominal bit rate associated with an encoder that generated the encoded content.

9. The method of claim 3, wherein transmitting the packets of encoded content comprises transmitting the packets of encoded content from a packager to an egress service for distribution of the encoded content to end user devices.

10. The method of claim 3, wherein transmitting the packets of encoded content comprises transmitting the packets of encoded content from an egress server to a plurality of end user devices, the method further comprising adding a fixed delay to the transmission timing information.

11. The method of claim 3, wherein the transmission bit rate corresponds to a nominal bit rate of a constant-bit-rate (CBR) encoder that generated the encoded content.

12. A system, comprising one or more processors and memory configured to:
receive media content including a sequence of video frames;

receive leaky-bucket fullness information for the sequence of video frames, the leaky-bucket fullness information corresponding to a leaky-bucket model;

based on the leaky-bucket fullness information, determine transmission timing information for packets of encoded content representing the sequence of video frames; and transmit the packets of encoded content using the transmission timing information such that a transmission bit rate is achieved that is smoothed relative to an encoding bit rate associated with the encoded content.

13. The system of claim 12, wherein the transmission timing information includes a transmission delay value for an initial packet of the packets of encoded content.

14. The system of claim 13, wherein the transmission delay corresponds to a sender buffer fullness value derived from the leaky-bucket fullness information.

15. The system of claim 14, wherein the leaky-bucket fullness information includes a receiver buffer fullness value, and wherein the one or more processors and memory are configured to wherein determine the transmission timing information by determining the sender buffer fullness value using the receiver buffer fullness value and a leaky-bucket capacity associated with the leaky-bucket model.

16. The system of claim 12, wherein the transmission timing information includes a duration value representing a time between transmission of successive packets of the packets of encoded content.

17. The system of claim 16, wherein the one or more processors and memory are configured to determine the transmission timing information by determining the duration value using a packet size for the packets of encoded content and a nominal bit rate associated with an encoder that generated the encoded content.

18. The system of claim 12, wherein the one or more processors and memory are configured to transmit the packets of encoded content from a packager to an egress service for distribution of the encoded content to end user devices.

19. The system of claim 12, wherein the one or more processors and memory are configured to transmit the packets of encoded content from an egress server to a plurality of end user devices, and wherein the one or more processors and memory are further configured to add a fixed delay to the transmission timing information.

20. The system of claim 12, wherein the transmission bit rate corresponds to a nominal bit rate of a constant-bit-rate (CBR) encoder that generated the encoded content.

* * * * *